US008226110B2

(12) United States Patent
Liao

(10) Patent No.: US 8,226,110 B2
(45) Date of Patent: Jul. 24, 2012

(54) FOLDABLE JOINT FOR BABY STROLLER

(75) Inventor: Gordon Liao, Yung Kang (TW)

(73) Assignee: Unique Product & Design Co., Ltd., Yung Kang, Tainan Hsien (TW)

( * ) Notice: Subject to any disclaimer, the term of this patent is extended or adjusted under 35 U.S.C. 154(b) by 432 days.

(21) Appl. No.: 12/575,521

(22) Filed: Oct. 8, 2009

(65) Prior Publication Data

US 2011/0084467 A1    Apr. 14, 2011

(51) Int. Cl.
*B62B 7/06* (2006.01)
*B62B 3/02* (2006.01)

(52) U.S. Cl. ........ 280/642; 280/647; 280/650; 280/658; 280/47.38

(58) Field of Classification Search .................. 280/642, 280/643, 644, 647, 648, 649, 650, 657, 658, 280/47.25, 47.38
See application file for complete search history.

(56) References Cited

U.S. PATENT DOCUMENTS

| 7,632,035 | B2 * | 12/2009 | Cheng .............................. 403/98 |
| 7,798,500 | B2 * | 9/2010 | Den Boer .................... 280/47.34 |
| 2003/0085551 | A1 * | 5/2003 | Allen et al. .................... 280/642 |
| 2006/0038382 | A1 * | 2/2006 | Valdez et al. ................. 280/647 |
| 2006/0061066 | A1 * | 3/2006 | Tan ................................ 280/642 |
| 2008/0143081 | A1 * | 6/2008 | Valdez et al. ................. 280/642 |
| 2009/0121455 | A1 * | 5/2009 | Kretschmer et al. .......... 280/642 |
| 2010/0244408 | A1 * | 9/2010 | Dean et al. .................... 280/647 |
| 2012/0025492 | A1 * | 2/2012 | Grintz et al. .................. 280/647 |

* cited by examiner

*Primary Examiner* — John R Olszewski
(74) *Attorney, Agent, or Firm* — Alan Kamrath; Kamrath IP Lawfirm, PA

(57) ABSTRACT

A baby stroller foldable joint includes a joint mechanism having a top frame joint, a bottom frame joint and a rear wheel frame joint connecting to the top frame, the bottom frame and the rear wheel frame respectively. Each frame joint is provided with a breach at its rim, and the breaches are aligned with one another. The joint mechanism has a gear set in its interior. A control mechanism has a slider flexible to move back and forth, driving a flexible block through a linkage, for the purpose of clasping or separating the breaches of the frame joints, to accomplish expansion or folding of the frame. By aforesaid combination, expansion or folding of the frame can be simultaneous and accomplished at one go, and expansion can even be locked automatically, to make the manipulation handy and swift.

7 Claims, 12 Drawing Sheets

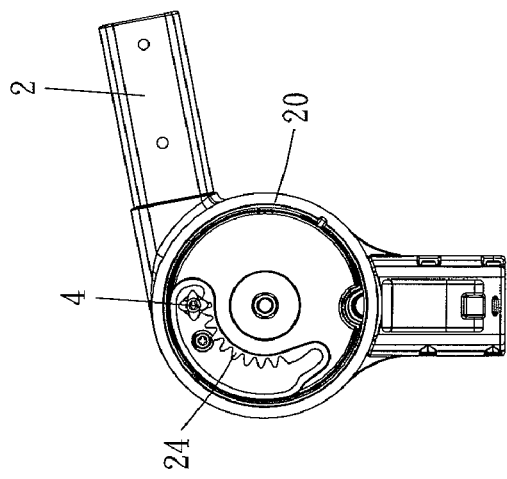
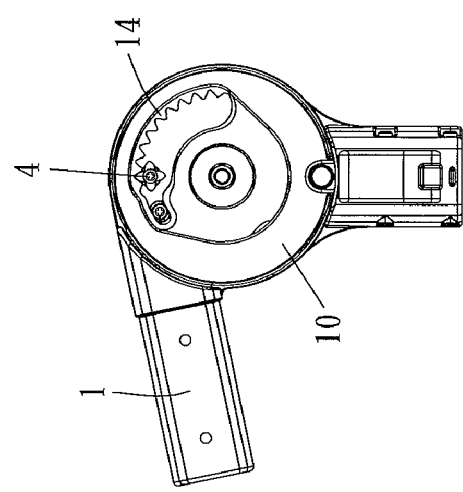
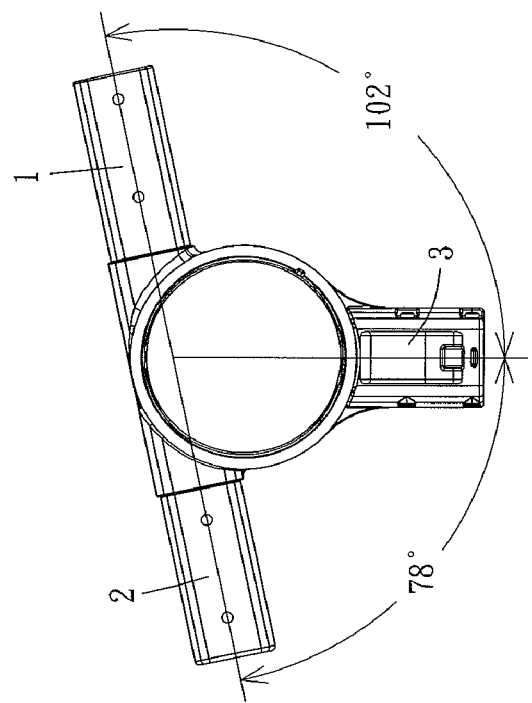

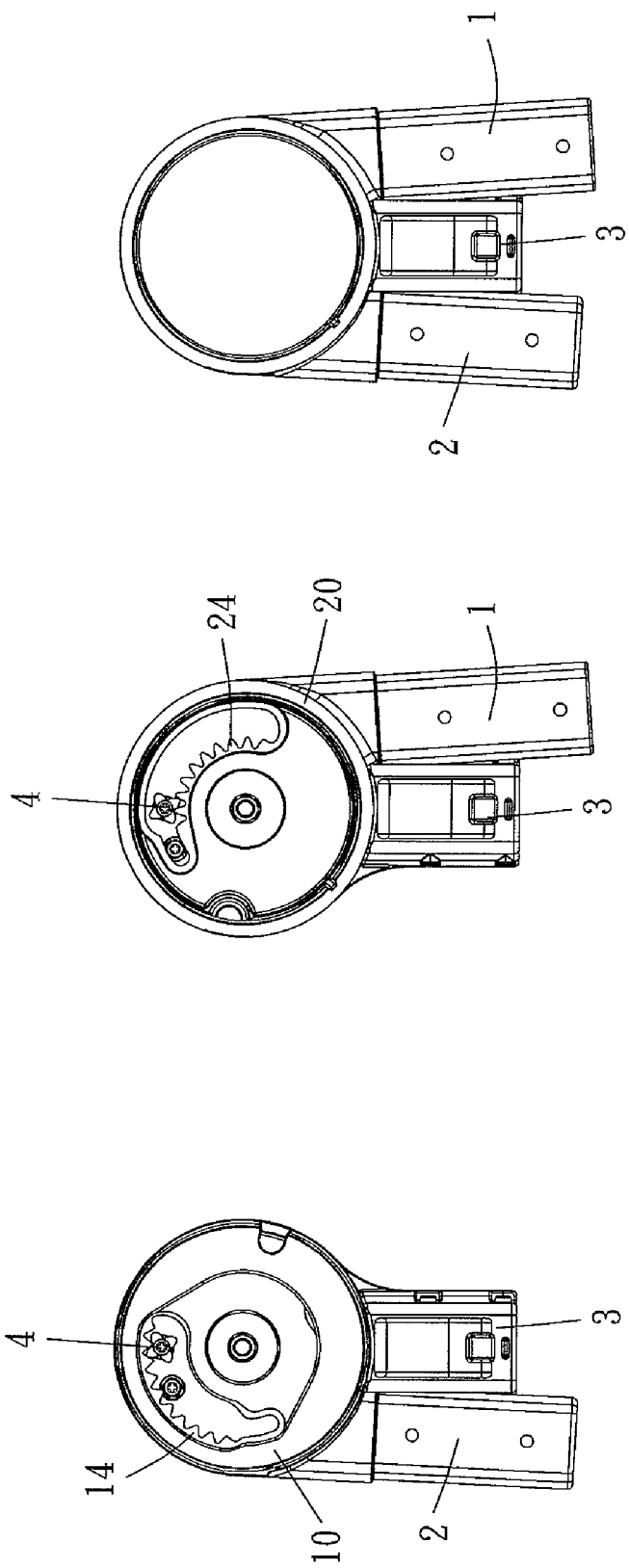

FOLDABLE JOINT FOR BABY STROLLER

BACKGROUND OF THE INVENTION

1. Field of the Invention

This invention relates generally to a baby stroller foldable joint and more specifically to one that features handiness and swiftness for the manipulation of expansion or folding of the frame and a structure featuring a second safe lock.

2. Description of the Prior Art

Prior art frames of baby strollers are mostly the design of links that feature an excess of parts, complicacy in structure, and plenty of joining, easily leading to a loose structure and surely prone to sway, which substantially deteriorates the manipulation of expansion or folding of the frame. It apparently demands a great improvement.

SUMMARY OF THE INVENTION

The objective of this invention is to provide a baby stroller foldable joint that features handiness and swiftness for the manipulation of expansion or folding, which is targeted at improvement of drawbacks of the prior art.

The other objective of this invention is to provide a baby stroller foldable joint provided with a second safe lock for avoiding careless manipulations.

To accomplish the aforementioned objectives, this invention comprises: a joint mechanism having a top frame joint, a bottom frame joint and a rear wheel frame joint connecting to the top frame, the bottom frame and the rear wheel frame respectively. The frame joints each is provided with a breach at its rim. The breaches are aligned with one another and have a gear set in its interior. A control mechanism has a slider flexible to move back and forth, and the slider drives the other flexible block through a linkage, for the purpose of clasping or separating the breaches of the frame joints, to accomplish expansion or folding of the frames. By aforesaid combination, expansion or folding of the frames can be simultaneous and accomplished at one go. The expansion state can be locked automatically, to achieve handiness and swiftness for the manipulation.

BRIEF DESCRIPTION OF THE DRAWINGS

FIG. 7 is a side view of the expansion of the frames of this invention;

FIG. 8 is a schematic sectional view (I) of the joint mechanism during the expansion of this invention;

FIG. 9 is a schematic sectional view (II) of the joint mechanism during the expansion of this invention;

FIG. 13 is a schematic sectional view (I) of the joint mechanism during the folding of this invention;

FIG. 14 is a schematic sectional view (II) of the joint mechanism during the folding of this invention;

FIG. 15 is a side view of the folding of this invention; and

DETAILED DESCRIPTION OF THE INVENTION

Figure 1:
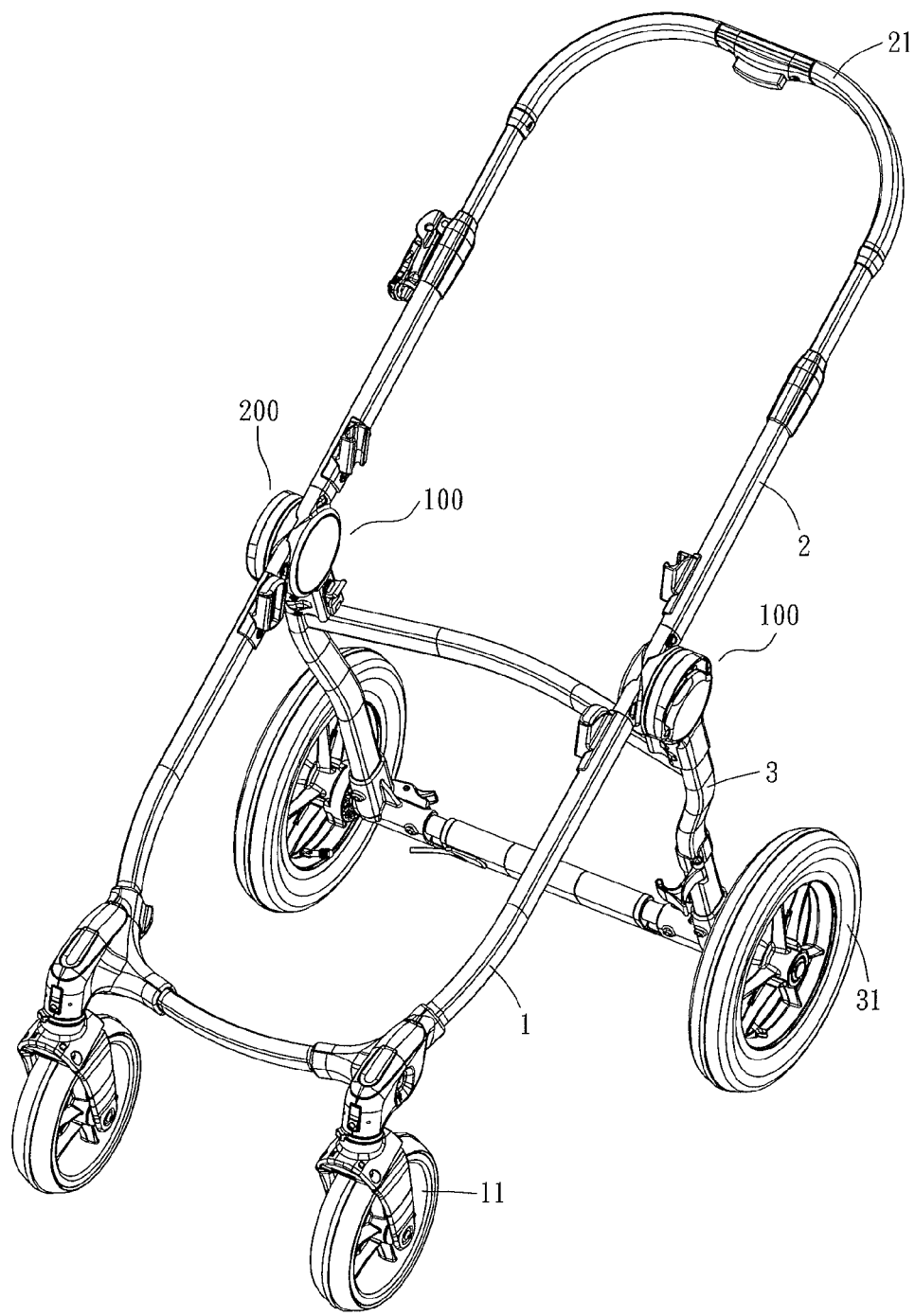
FIG. 1 is a three-dimensional view of this invention mounted on a baby stroller.
Figure 2:
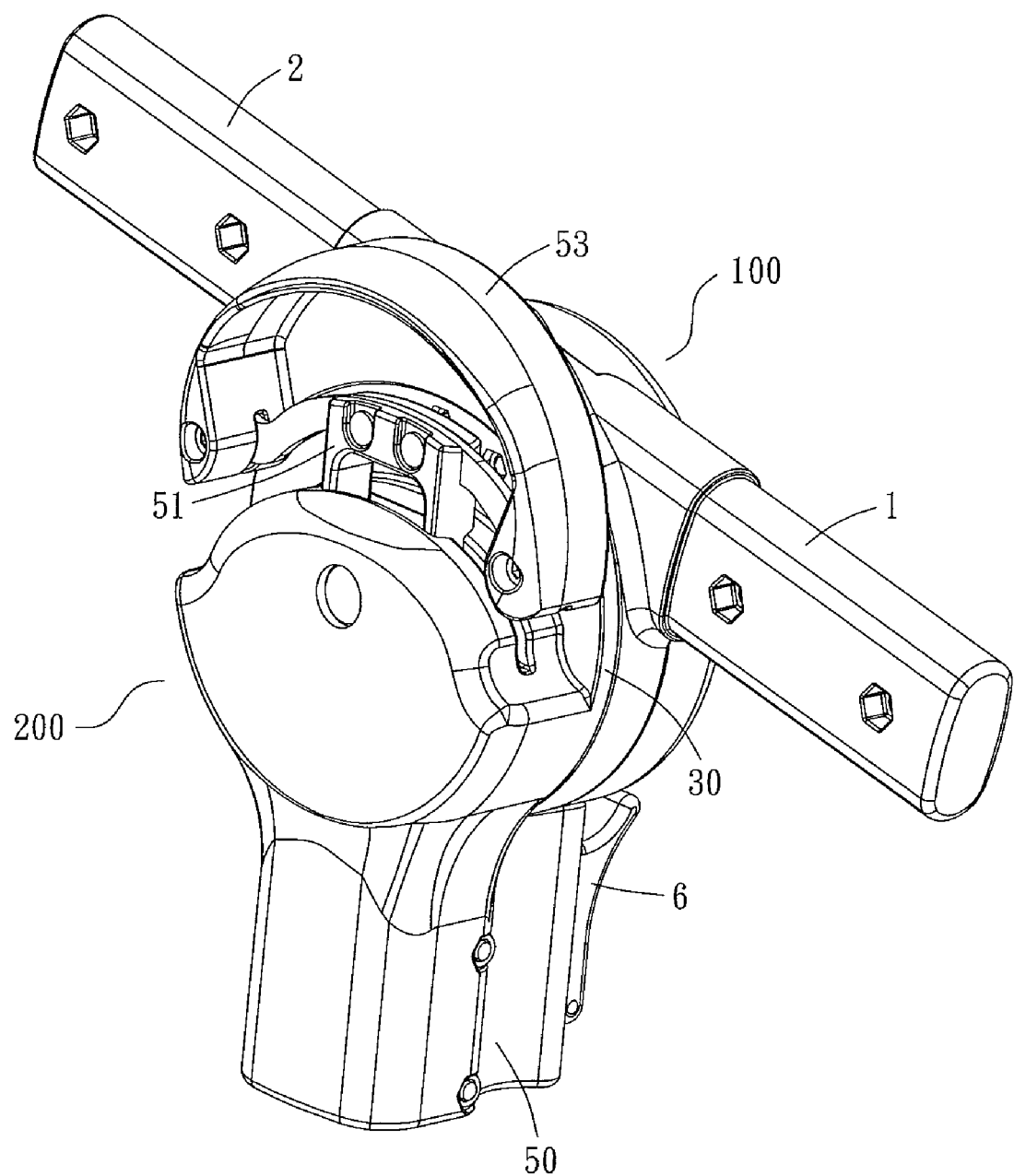
FIG. 2 is a three-dimensional view of the back side of this invention.
Figure 3:
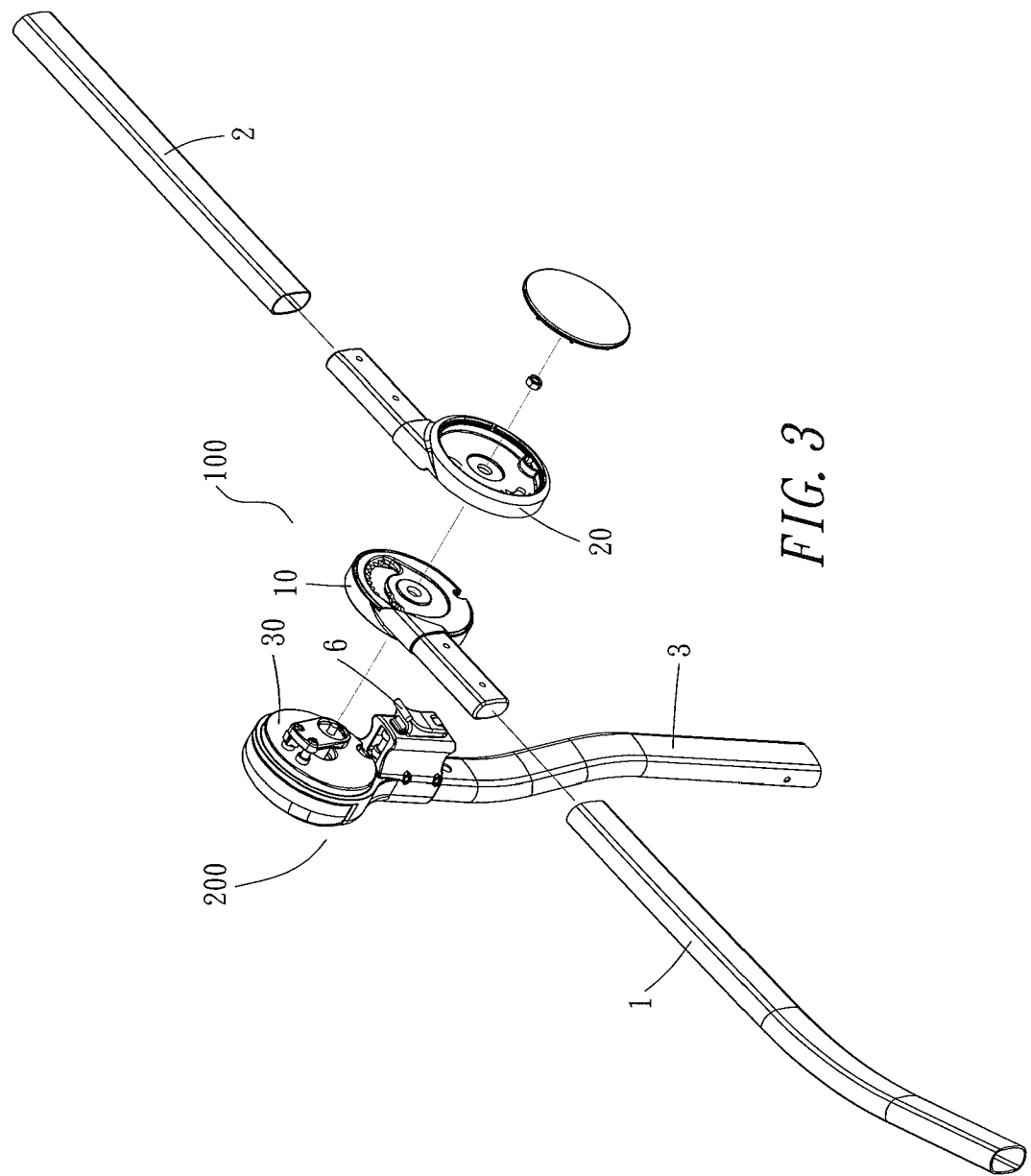
FIG. 3 is a three-dimensional exploded view (I) of this invention.
Figure 4:
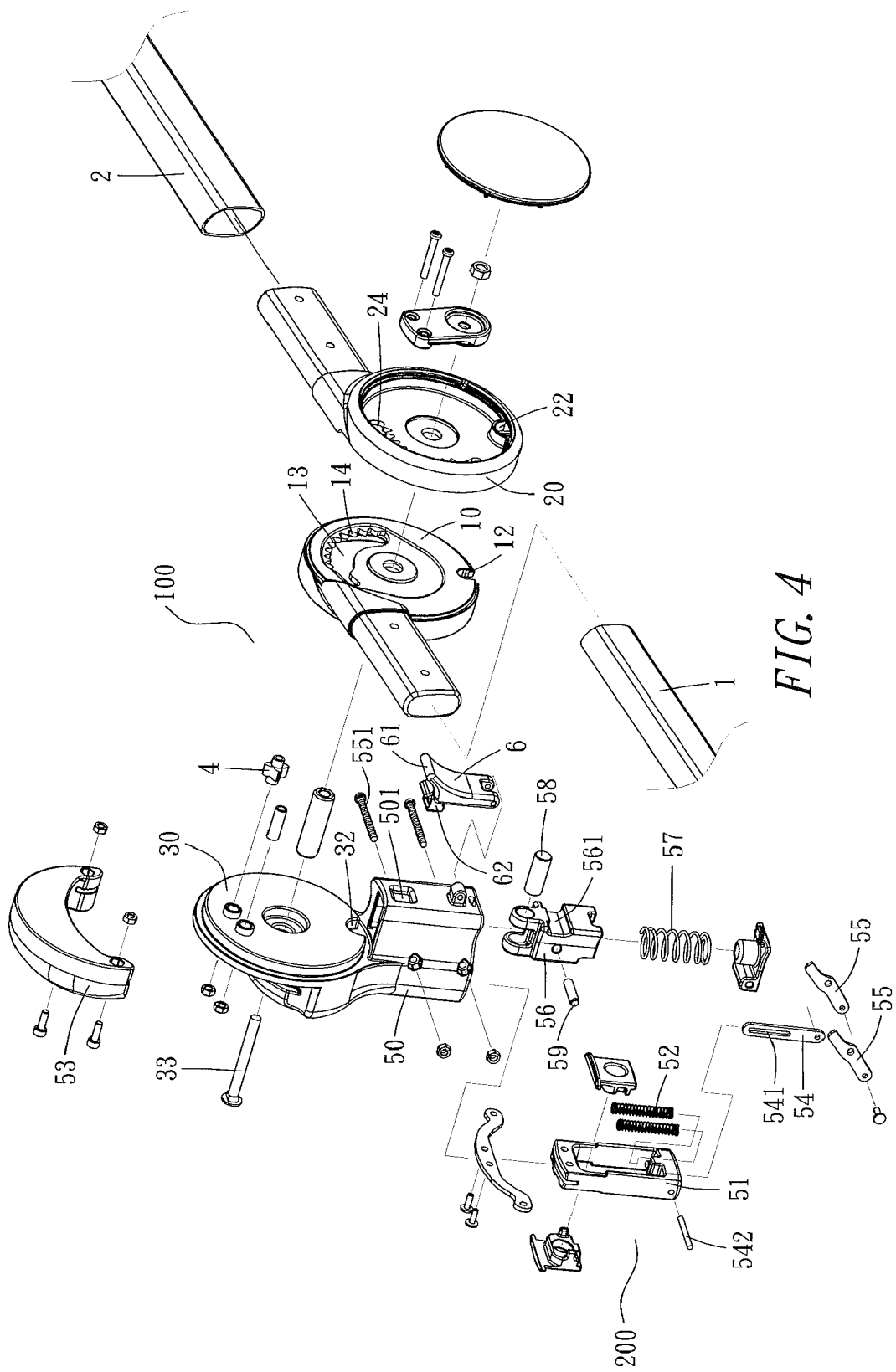
FIG. 4 is a three-dimensional exploded view (II) of this invention.
Figure 5:
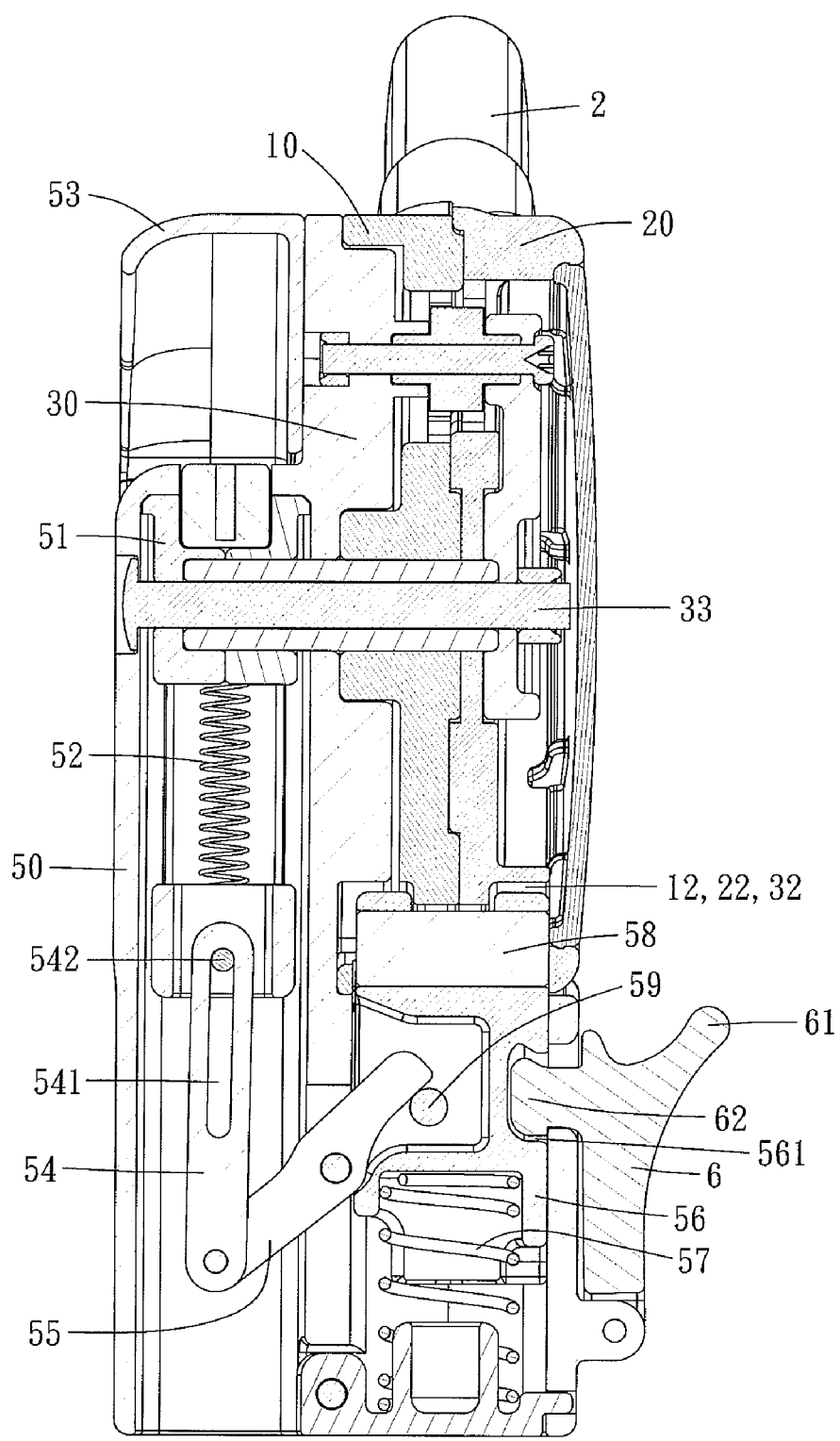
FIG. 5 is an assembled sectional view of the axial direction of this invention.
Figure 6:
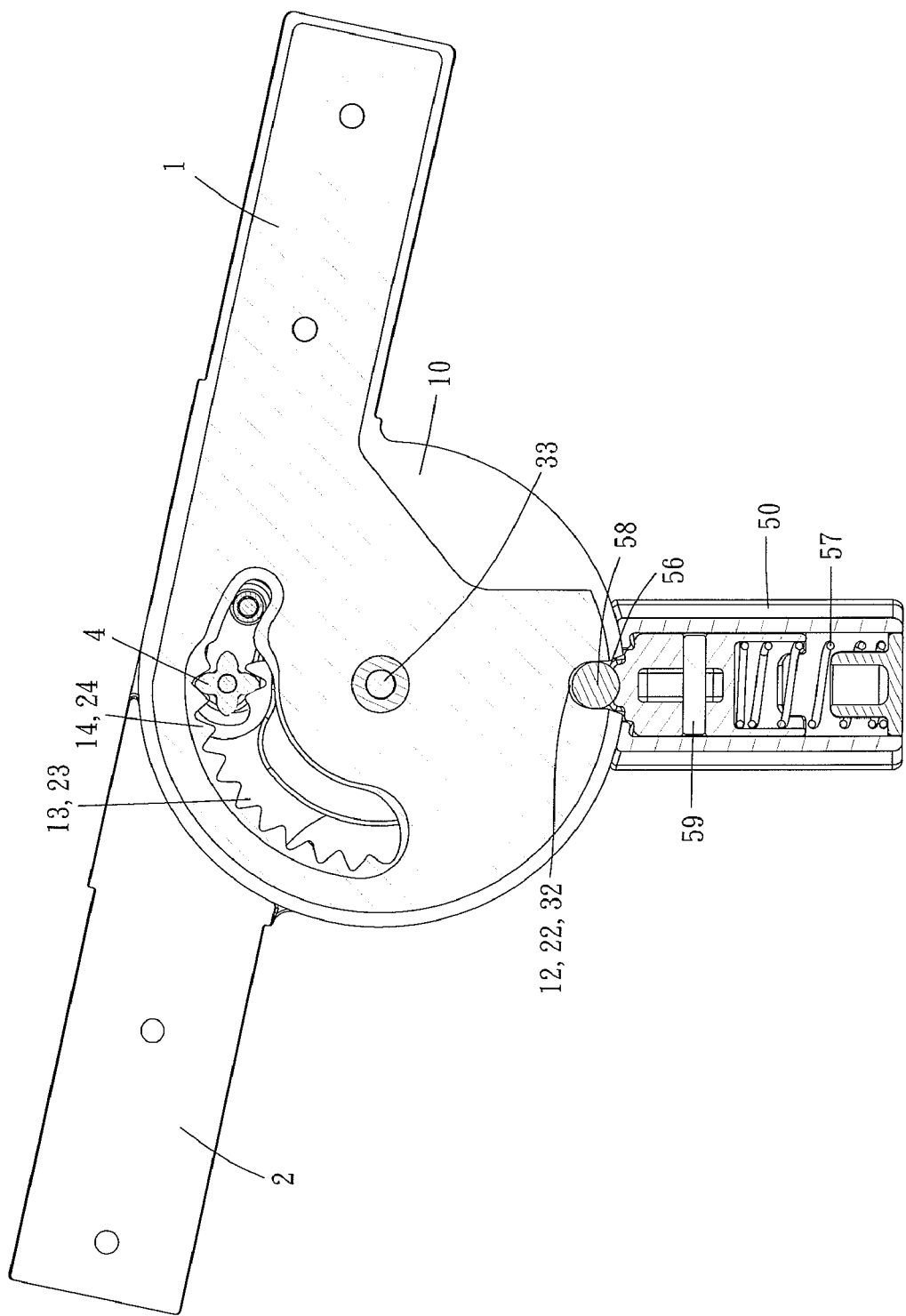
FIG. 6 is an assembled sectional view of the radial direction of this invention.

The structural traits and function of this invention are described in detail with reference to the following preferred embodiments and the accompanying drawings, which would give a thorough comprehension and recognition on this invention.

Referring to FIGS. 1-6, this invention comprises: a joint mechanism 100 and a control mechanism 200, and these mechanisms are located at the opposite sides of the stroller frame. To be easy for understanding, the following description is based on the rule that only picks one out of like mechanisms.

The joint mechanism 100 comprises: a bottom frame 1 joining two front wheels 11 at its bottom and joining fixedly a bottom frame joint 10 at its top. The joint 10 is provided with a breach 12 at the bottom of its outer rim and a curved trough 13 at the top of its inner side. The trough 13 is provided with a first tooth row 14 at its top. A top frame 2 joins a handle tube 21 at its top and joins fixedly a top frame joint 20 at its bottom. The joint 20 is provided with a breach 22 at the bottom of its outer rim and a curved trough 23 at the top of its inner side. The trough 23 is provided with a second tooth row 24 at its bottom. A rear wheel frame 3 joins two rear wheels 31 at its bottom and joins fixedly a rear wheel frame joint 30 at its top. The joint 30 is provided with a breach 32 at the bottom of its outer rim. A linking pinion 4 is set up at one side near the center of the rear wheel frame joint 30 is and located in between the curved trough 23 of the top frame joint 20 and the curved trough 13 of the bottom frame joint 10, which are geared to the first tooth row 14 and the second tooth row 24 respectively. The top frame joint 20, the bottom frame joint 10 and the rear wheel frame joint 30 are fastened together by a fixing screw 33, and the bottom frame joint 10 is located in between the top frame joint 20 and the rear wheel frame joint 30. The breaches 12, 22, and 32 are aligned with one another on a straight line, and the first tooth row 14, the second tooth row 24 and the linking pinion 4 form a gear set.

The control mechanism 200 comprises a fixed stand 50 set up at the back side and bottom of the rear wheel frame joint 30. The fixed stand 50 has a cavity at each of its front side and back side, and the front cavity is provided with an opening 501 near its top. A slider 51 set up in the back cavity of the fixed stand 50 and has a springy member 52 in its interior, which empowers the slider a downward force, to form a flexible springy slider. A lug 53, in the shape of an arc with a concave at its interior, is set up at the back side of the fixed stand 50 and joined with the top end of the slider 51. A drag pole 54, having a long trough 541 on its top, is in pinned connection to the bottom of the slider 51 with a fixing pin 542. A block 56, set up in the front cavity of the fixed stand 50, has a springy member 57 in its interior that empowers the block 56 an upward force, to form a springy block flexible to move back and forth. The block 56 is provided with a snap rod 58 at its top, which can clasp or separate the breaches 12, 22 and 32 of the bottom frame joint 10, the top frame joint 20 and the rear wheel frame joint 30 respectively. The block 56 is provided with a indent 561 at the middle of its front side and a block pin 59 near its back side. A lever 55 has one end in pinned connection to the bottom of the drag pole 54, the middle portion pinned fixedly by a pin link 551, and the other end pushed against the top end of the block pin 59.

Moreover, this invention is provided with a buckle 6 in pinned connection to the front side of the aforesaid fixed stand 50. The buckle 6 is provided with a pull plate 61 and a plug 62. The plug 62 can pass through the opening 501 of the fixed stand 50 to arrive at the indent 561 of the block 56, to stabilize the block 56, and to form a second safe lock.

According to the aforesaid structural combination, once the frame of stroller is being expanded, the included angle between the bottom frame 1 and the rear wheel frame 3 is about 102 degrees, while the included angle between the top frame 2 and the rear wheel frame 3 is about 78 degrees, shown in FIG. 7. At this moment, the snap rod 58 at the top of the block 56 of the control mechanism 200 penetrates the breaches 12, 22 and 32 of the frame joints of the joint mechanism 100, to form a first clench. The linking pinion 4 is geared to the left side of the first tooth row 14 of the bottom frame joint 10 and to the right side of the second tooth row 24 of the top frame joint 20. A barrier rod barricades the left side of the trough 13 of the bottom frame joint 10, while the plug 62 of the buckle 6 clips to the indent 561 of the block 56, to form a second safe lock, shown in FIGS. 5, 6, 8 & 9.

Figure 10:
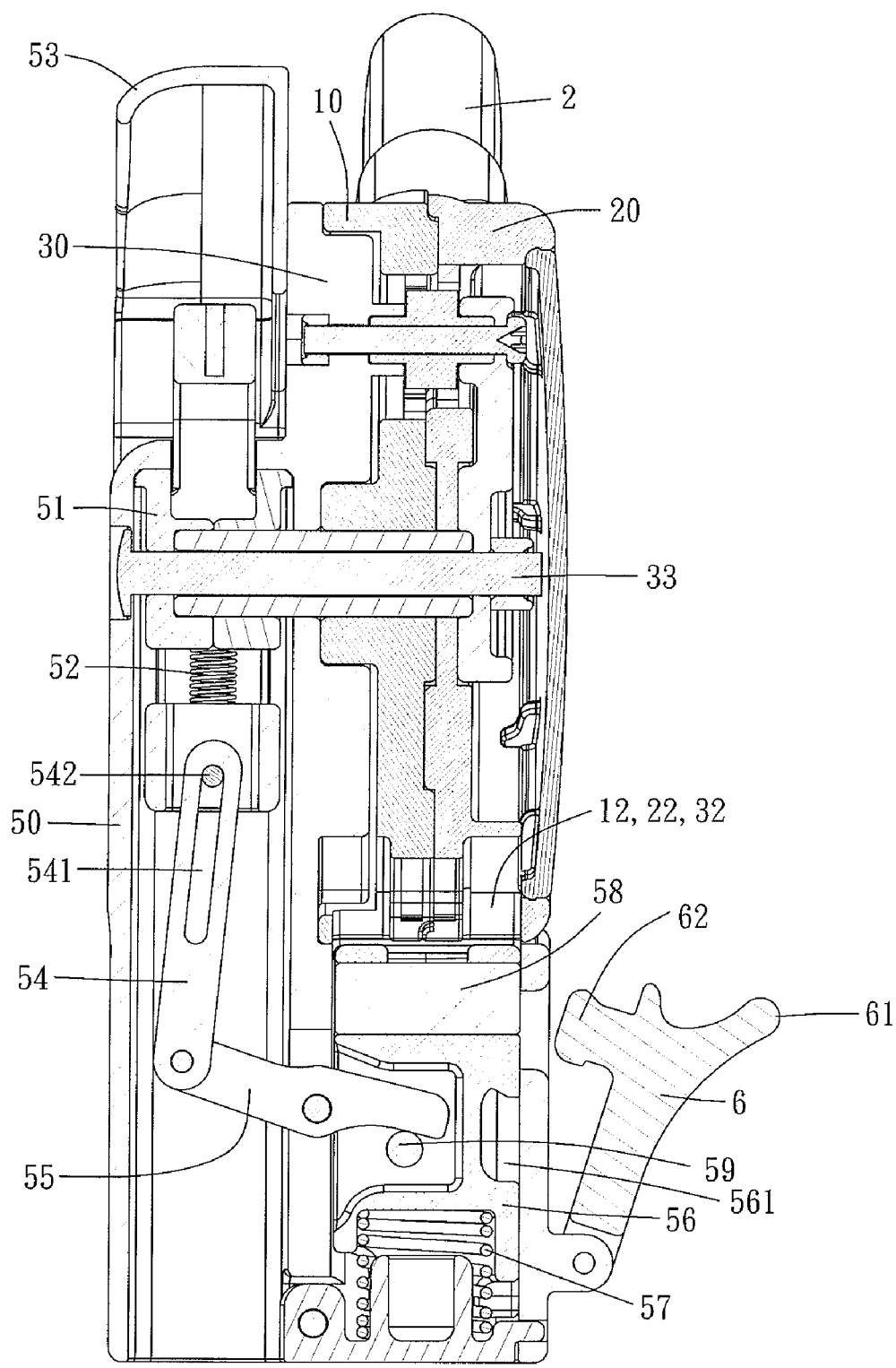
FIG. 10 is a schematic sectional view (I) of the axial direction of the control mechanism during the folding of this invention.
Figure 12:
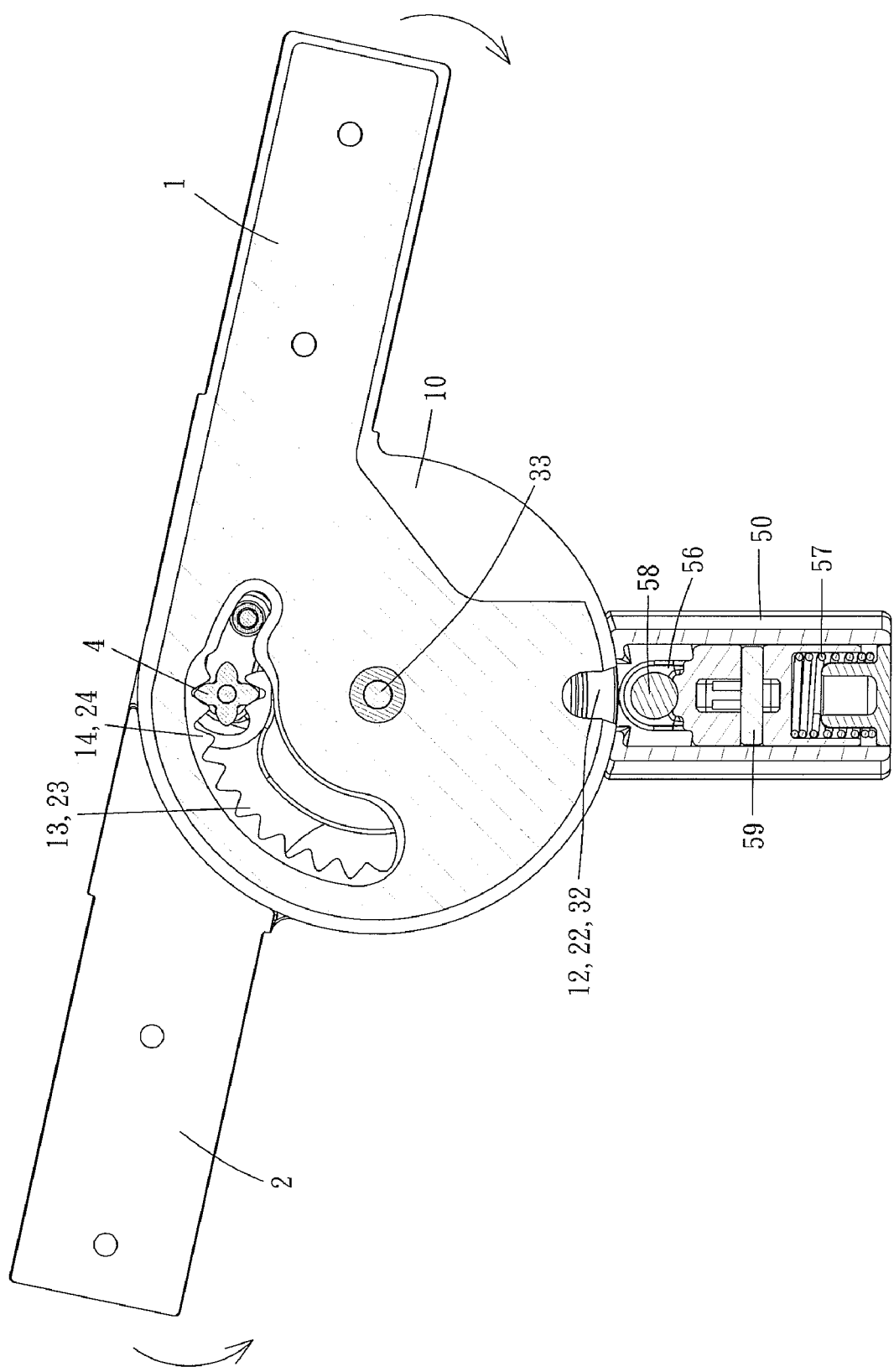
FIG. 12 is a schematic sectional view of the radial direction of the control mechanism during the folding of this invention.

For folding, the buckle 6 is pulled outward to break the plug 62 away from the indent 561 of the block 56, and the lug 53 is pulled up to move the slider 51 upward. The drag pole 54, the lever 55 and the block pin 59 press the block 56 to move down, the snap rod 58 is ready to depart from the breaches 12, 22 and 32 of the joints respectively, shown in FIGS. 10 & 12, followed by dragging the lug 53 up to make the top frame 2 and the bottom frame 1 move down automatically toward the rear wheel frame 3 to be folded by their own gravity. The driving by the gear set, made up of the linking pinion 4, the first tooth row 14 and the second tooth row 24, the top frame 2 and the bottom frame 1 are simultaneously driven to approach the rear wheel frame 3 for folding, shown in FIGS. 13~15, to accomplish folding of the stroller frame.

Figure 11:
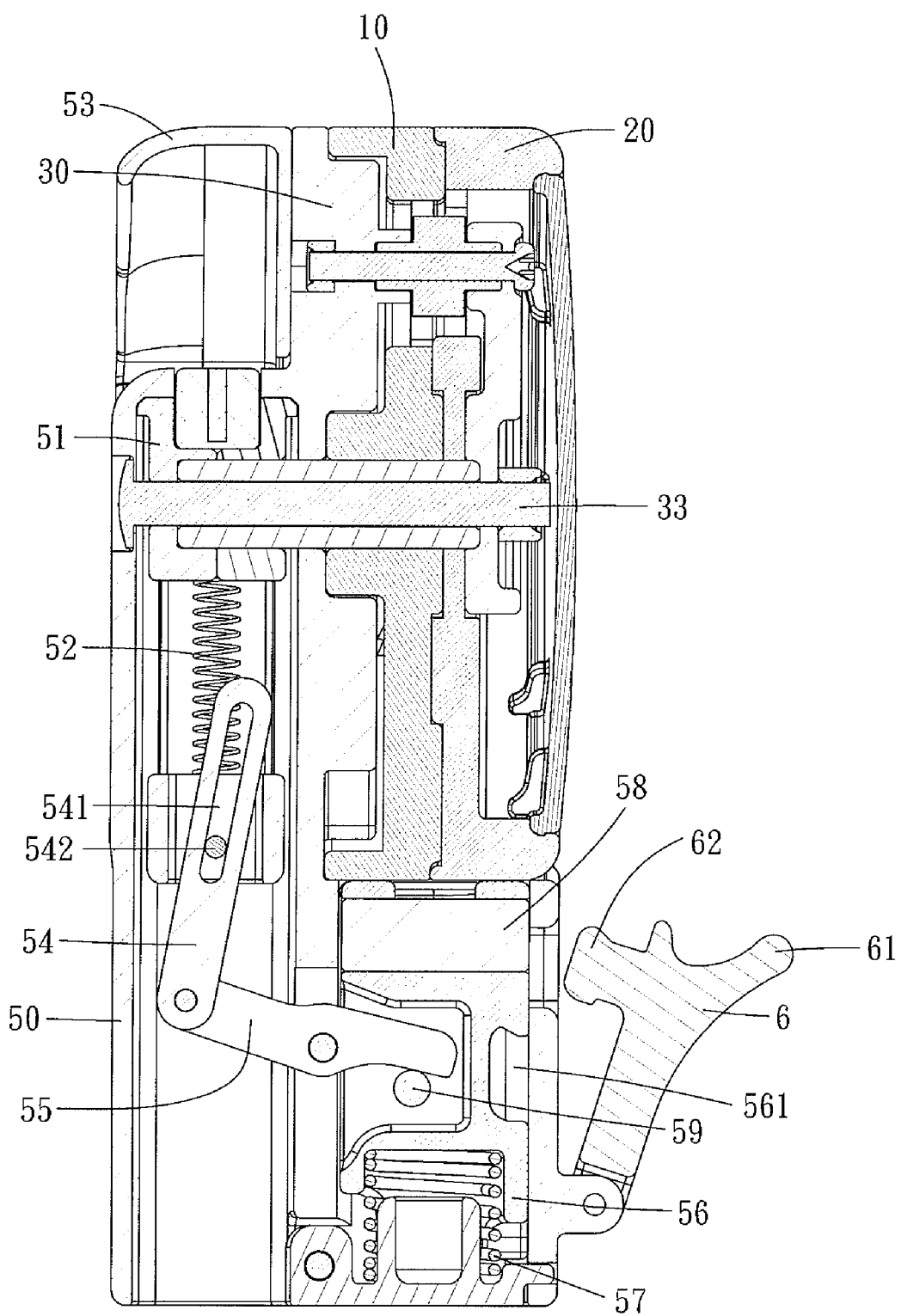
FIG. 11 is a schematic sectional view (II) of the axial direction of the control mechanism during the folding of this invention.

Once the stroller frame is folded, releasing the lug 53 will make the slider 51 immediately move down automatically to its position through the resilient force of the springy member 52, which further makes the lug 53 move down simultaneously to its position. Meanwhile, the drag pole 54 is also dragged to move down, so the lever 55 is driven not to press the block 56 down. At the moment the snap rod 58 escapes from the breaches 12, 22 and 32 and the breaches are not aligned to one another, the block 56 is still clasped at the bottom of the joints 10, 20 and 30, shown in FIG. 11. Accordingly, it thus not only maintains the completeness of the outlook of the stroller frame but avoids damage by collision from the external force.

Figure 16:
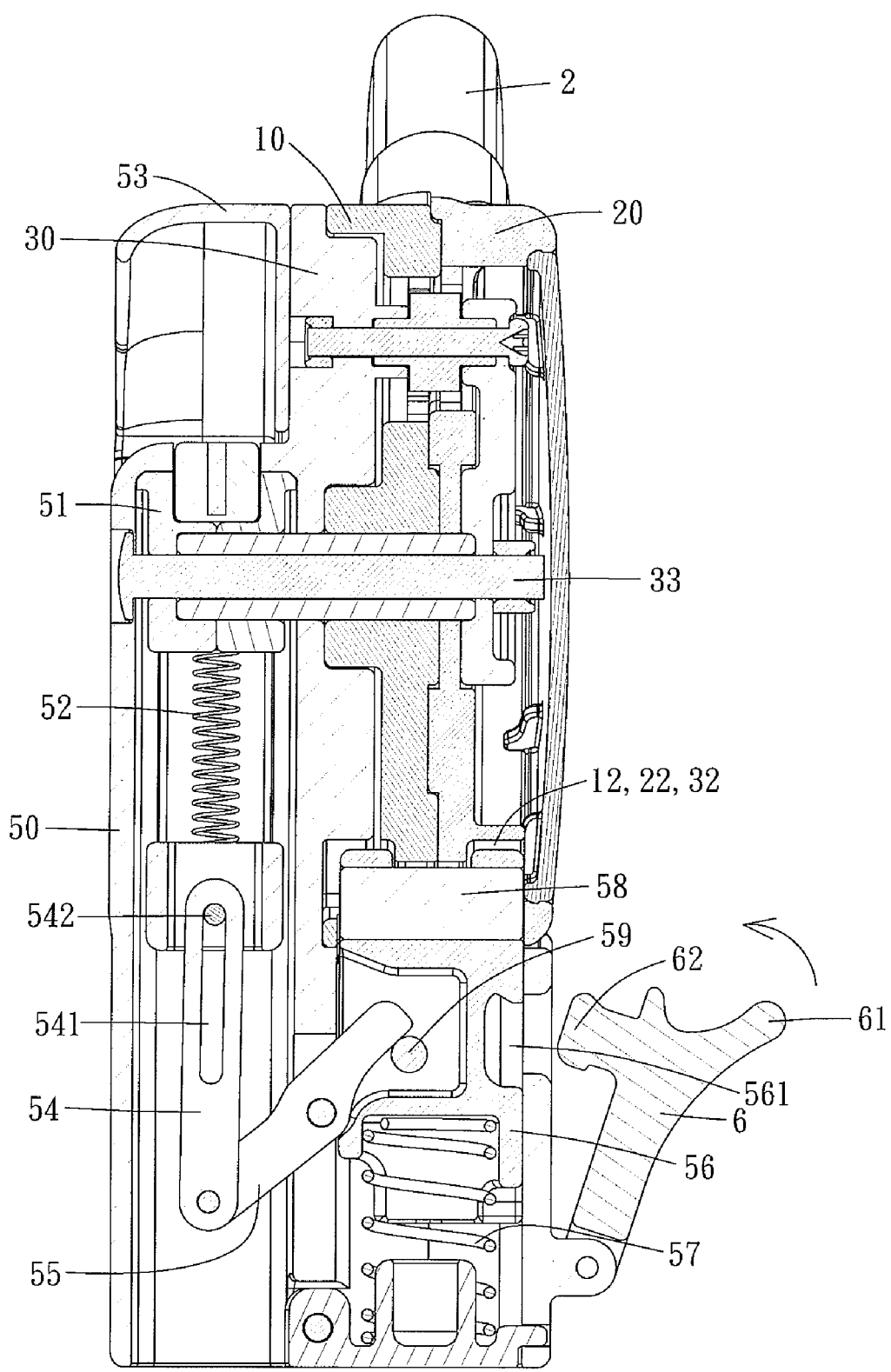
FIG. 16 is a schematic sectional view of the control mechanism during the expansion of this invention.

To be expanded again, the top frame 2 and the bottom frame 1 are dragged up and outward, to separate from the rear wheel frame 3. Through driving of the gear set, the frames are expanded simultaneously, which enables the breaches 12, 22 and 32 of the frame joints to aim at the snap rod 58. The block 56 can naturally move up to its position by the resilient force of the springy member 57, to drag the snap rod 58 to be clasped by the breaches 12, 22 and 32 of the frame joints, shown in FIG. 16, which enables a simultaneous expansion and a fixing for the top frame 2, the bottom frame 1 and the rear wheel frame 3, shown in FIGS. 5-9, followed by a push on the buckle 6 to have its plug 62 be clasped by the block 56, shown in FIG. 5. That can avoid careless mistakes to lead to the occurrence of the folding of the stroller.

According to the aforesaid structure and operation, the joint mechanism 100 of this invention comprises a top frame joint 20, a bottom frame joint 10 and a rear wheel frame joint 30 connecting to the top frame 2, the bottom frame 1 and the rear wheel frame 3 respectively. Each frame joint is provided with a breach 12, 22 or 32 at its outer rim, and the breaches 12, 22 and 32 are aligned with one another. The joint mechanism 100 has a gear set in its interior, where the diameter ratio and tooth ratio of the linking pinion 4 with respect to the first tooth row 14 and the second tooth row 24 are available for the necessary setting to synchronize the frame movements during expansion or the folding, and to maintain a same angle ratio, which enables the three frame joints 10, 20 and 30 to keep their relevant positions both for expansion or folding. Especially for the situation of expansion, the expanded movement ends with an automatic lock. The included angle between the rear wheel frame 3 and the bottom frame 1 is 102 degrees, and that between the rear wheel frame 3 and the top frame 2 is 78 degrees, shown in FIG. 7.

The control mechanism 200 comprises a slider 51 flexible to move back and forth and a block 56, and the slider 51 is able to move up due to a pull-up to the lug 53. Through the linkage made up of the drag pole 54 and the lever 55, the block 56 is dragged to move down, which makes displacement of the slider 51 opposite to that of the block 56. Both return to their positions by the resilient force of the springy members 52, 57 respectively. The block 56 is provided with a snap rod 58 at its top, which is used to clasp or separate the breaches 12, 22 and 32 of the three frame joints of the joint mechanism 100, to achieve expansion or folding of the stroller.

In conclusion, this invention has at least the following advantages and efficacy that are much more creative than the prior art:

1. The expansion or folding of this stroller features synchronous and coherent motions, and no matter whichever portion a user exerts a force, expansion or folding of the stroller can be accomplished with ease, which makes manipulation handy and swift.

2. The expansion of the frame is capable of being locked automatically, and a second safe lock is devised to avoid careless mistakes to trigger the occurrence of folding.

3. During the folding of the frame, the lug is able to move back to its position automatically, which helps to maintain the completeness of the outlook but avoid damage by collisions from external forces.

Accordingly, the disclosed structure of the exemplary embodiment of this invention is absolutely novel to the prior art. It surely can accomplish the expected objective and function, which is construed as having not only novelty and creativeness but usefulness.

What is claimed is:

1. A baby stroller foldable joint comprising:
a joint mechanism having a top frame joint, a bottom frame joint and a rear wheel frame joint connecting to a top frame, a bottom frame, and a rear wheel frame respectively, wherein each frame joint is provided with a breach at a rim, wherein the breaches are aligned with one another, with the joint mechanism having a gear set in an interior of the joint mechanism; and
a control mechanism, having a slider flexible to move back and forth, to drive a flexible block through a linkage, for clasping or separating the breach of each frame joint, to accomplish expansion or folding of the frames;

wherein expansion or folding of the frames being simultaneous and accomplished at one go, and wherein expansion of the frames is locked automatically, to make manipulation handy and swift.

2. A baby stroller foldable joint as in claim 1 wherein the gear set comprises: a first tooth row set up in the bottom frame joint, a second tooth row set up in the top frame joint and a linking pinion set up near a center of the rear wheel frame joint.

3. A baby stroller foldable joint as in claim 1 wherein said control mechanism is provided with a lug joined with the slider.

4. A baby stroller foldable joint as in claim 1 wherein the linkage of said control mechanism comprises: a drag pole joined with the slider, and a lever in pivotal connection with the drag pole.

5. A baby stroller foldable joint as in claim 1 wherein the flexible block of said control mechanism is provided with a snap rod at a top of the flexible block.

6. A baby stroller foldable joint as in claim 1 wherein said control mechanism further comprises:
   a fixed stand set up at a back side and a bottom of the rear wheel frame joint, with the slider set up in an interior of the fixed stand and behind the back side, with the fixed stand having a springy member in the interior of the fixed stand;
   a lug set up at the back side of the fixed stand and joined with a top end of the slider;
   a drag pole having a long trough and in pinned connection to a bottom of the slider by a fixing pin, with the flexible block set up in the interior of the fixed stand and behind a front side of the fixed stand, with the flexible block having a springy member in an interior of the flexible block, a snap rod at a top portion of the flexible block, and a block pin at a middle portion of the flexible block; and
   a lever having one end in pinned connection to a bottom of the drag pole, a middle portion of the lever is fixed by a pin link, and an end of the lever pushed against a top end of the block pin.

7. A baby stroller foldable joint as in claim 6 wherein the fixed stand is provided with a safe lock at an outer side of the fixed stand, for seizure of the flexible block.

\* \* \* \* \*